United States Patent [19]

Geyken et al.

[11] 4,449,278
[45] May 22, 1984

[54] ROLLER FOR SUPPORTING MATERIAL SENSITIVE TO RADIATION AND, METHOD OF MAKING THE SAME

[75] Inventors: Erwin Geyken, Neubiberg; Horst Köninger; Günter Schirk, both of Munich, all of Fed. Rep. of Germany

[73] Assignee: Agfa-Gevaert Aktiengesellschaft, Leverkusen, Fed. Rep. of Germany

[21] Appl. No.: 352,004

[22] Filed: Feb. 24, 1982

[30] Foreign Application Priority Data

Mar. 26, 1981 [DE] Fed. Rep. of Germany ....... 3111923

[51] Int. Cl.³ .................. B21B 31/08; B21D 31/00
[52] U.S. Cl. ............................. 29/132; 29/148.4 D; 29/527.4
[58] Field of Search ............... 29/130, 132, 148.4 D, 29/516, 527.2, 527.4; 72/105, 106

[56] References Cited

U.S. PATENT DOCUMENTS

| 1,619,371 | 3/1927 | Rogers et al. ................ 29/123 X |
| 2,046,503 | 7/1936 | Cooper ...................... 29/148.4 D |
| 2,217,552 | 10/1940 | Horton ......................... 29/130 X |
| 3,553,804 | 1/1971 | Kopsch et al. . |
| 3,639,959 | 2/1972 | Bagley et al. ..................... 29/132 |
| 3,650,005 | 3/1972 | Kamiya et al. . |
| 3,724,047 | 4/1973 | Peterson ........................ 29/132 X |
| 3,778,885 | 12/1973 | Stoll . |
| 3,971,115 | 7/1976 | Schneider et al. .......... 29/148.4 D |
| 4,229,950 | 10/1980 | Fessenden . |

Primary Examiner—Howard N. Goldberg
Assistant Examiner—Carl J. Arbes
Attorney, Agent, or Firm—Peter K. Kontler

[57] ABSTRACT

A roller for transporting and/or squeezing sheet-like photographic material has a metallic tubular core. The core has a cylindrical central portion of relatively large diameter and a pair of cylindrical ends of smaller diameter which constitute journals for the roller. The journals merge into the central portion via respective conical transition portions which widen in the direction from the corresponding journal to the central portion. The central portion and transition portions are surrounded by an annular coating of rubber or a synthetic resin. The core is produced by swaging the ends of a tube having the same diameter as the central portion of the core so as to form the journals and the transitions portions. The core obtained in this manner is coated by extruding or injection molding a synthetic resin, or by vulcanizing rubber, on to the same. The roller is lightweight, stable and inexpensive to manufacture.

37 Claims, 1 Drawing Figure

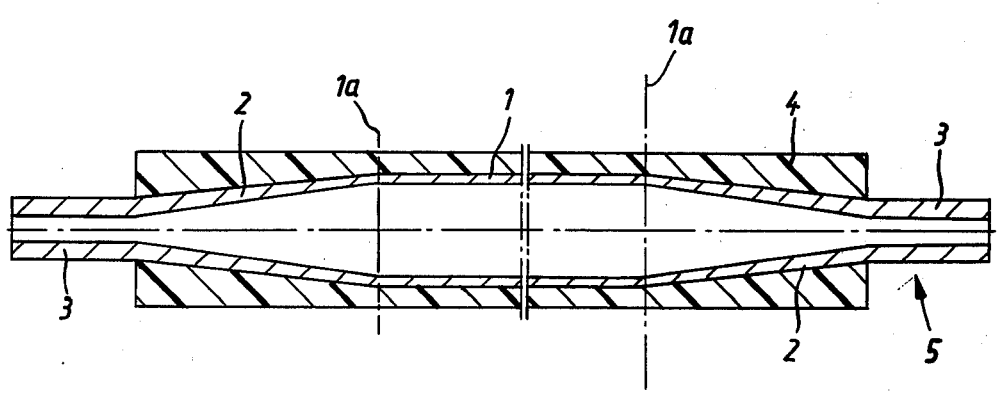

ROLLER FOR SUPPORTING MATERIAL SENSITIVE TO RADIATION AND, METHOD OF MAKING THE SAME

BACKGROUND OF THE INVENTION

The invention relates generally to a roller for supporting material which is sensitive to radiation and to a method of making such a roller.

More particularly, the invention relates to a roller for transporting and/or squeezing sheets or strips of photographic material as well as to a method of making the roller.

The U.S. Pat. No. 3,971,115 discloses a method of making a roller in which a long metallic tube is provided with a coating. The coated tube is cut to the desired length and synthetic resin inserts carrying stub shafts are then adhesively secured in the open ends of the tube. The inserts are subsequently joined to the coating on the tube in a fluid-tight manner.

Although a roller produced in this manner has good quality, it is relatively expensive. This is mainly due to the fact that the manufacturing costs are high. Thus, the manufacturing procedure involves not only processing of the coated metallic tube but also involves the operations of producing the inserts and stub shafts individually and subsequently mounting the stub shafts in the inserts. The cost of the material for the inserts and for the stub shafts also contributes to the high cost of the roller.

OBJECTS AND SUMMARY OF THE INVENTION

It is an object of the invention to provide a relatively inexpensive method of making a roller for supporting material sensitive to radiation.

Another object of the invention is to provide a relatively rapid method of making a roller for supporting material which is sensitive to radiation.

An additional object of the invention is to provide a relatively low cost roller for supporting material which is sensitive to radiation.

A concomitant object of the invention is to provide a relatively lightweight roller for supporting material which is sensitive to radiation.

It is also an object of the invention to provide a relatively high-strength roller for supporting material which is sensitive to radiation.

Yet another object of the invention is to provide a roller of improved stability for supporting material which is sensitive to radiation.

The preceding objects, as well as others which will become apparent as the description proceeds, are achieved by the invention.

One aspect of the invention relates to a method of making a roller for supporting material sensitive to radiation, particularly for transporting and/or squeezing sheet-like photographic material, e.g. sheets or strips of photographic material. The method involves forming bearing portions or journals at the ends of an elongated supporting member or core by subjecting the ends to deforming forces which reduce the cross-sectional areas thereof. A protective coating is applied to the member.

According to one embodiment of the invention, the roller is of the type having a length which is large as compared to its diameter. The core is in the form of a cylindrical metallic tube which, prior to the forming operation, has a length which is slightly smaller than the final length of the roller. The forming operation is performed in such a manner that the central portion of the core remains undeformed. The ends of the core, which constitute journals for the roller, are cylindrical and merge into the central portion of the core via conical transition portions produced on the core during the forming operation, that is, the core is formed with portions of varying cross-sectional area which connect the relatively large central portion of the core with the relatively small journals. The coating, which is preferably resistant to aggressive fluids, is applied along substantially the entire length of the transition portions and the central portion. The coating is annular and concentric with the journals.

In a preferred embodiment of the invention, the forming operation is performed by swaging the ends of the core.

The method of the invention enables the core of the roller to be produced in a single operation within a matter of seconds. An important factor in reducing the manufacturing time resides in that the removal of burrs or turnings from the core may be eliminated as may be the operation of machining the ends of the core. Thus, the swaging or deforming action itself is capable of producing a smooth or burnished surface. Furthermore, since the desired coating, e.g. a layer of elastomeric material or a synthetic resin, is applied to the core after production thereof so that all parts of the core to be coated can be coated at the same time, the operation of connecting the coating with inserts may be eliminated. Moreover, the weight of the roller according to the invention is less than that of the conventional roller described above since the roller of the invention does not require separate inserts or stub shafts. In addition, the core of the roller in accordance with the invention is more stable than the core of the known roller inasmuch as the core is compressed and its density increased in the regions of the transition portions. This has the effect of increasing the resistance of the roller to bending.

Another aspect of the invention resides in a roller for supporting material sensitive to radiation, particularly for transporting and/or squeezing sheet-like photographic material. The roller comprises a continuous, i.e. a one piece, elongated supporting member or core having a central portion of predetermined cross-sectional area and ends of smaller cross-sectional area constituting bearing portions or journals thereof. A protective coating is provided on the core.

The novel features which are considered as characteristic of the invention are set forth in particular in the appended claims. The improved roller itself, however, both as to its construction and its mode of operation, together with additional features and advantages thereof, will be best understood upon perusal of the following detailed description of certain specific embodiments wth reference to the accompanying drawing.

BRIEF DESCRIPTION OF THE DRAWING

The single FIGURE represents a schematic, longitudinal cross-sectional view of a roller according to the invention.

DESCRIPTION OF THE PREFERRED EMBODIMENTS

The FIGURE illustrates a roller for transporting and/or squeezing sheets or strips of photographic material. The roller includes a tubular, metallic core or supporting member 5 having a coating 4 which is resistant to aggressive fluids. The core 5 has a cylindrical central portion 1 of relatively large diameter and a pair of cylindrical ends 3 of smaller diameter which constitute bearing portions or journals for the roller. The central portion 1 of the core 5 is connected with the journals via respective transition portions 2 of varying cross-sectional area which are here conical. The core 5 is continuous, that is, the central portion 1 is of one piece with the transition portions 2 and journals 3.

The roller is of the type having a length which is large as compared to its diameter.

The core 5 is preferably composed of a corrosion-resistant material which is also resistant to the action of chemicals. An example of such a material is V4A. It is particularly advantageous to use V4A having the identifying number 1.4401. An important criterion for the material of the core 5 is that it be capable of forming a good bond with the coating 4.

The coating 4 is annular and concentric with the core 5. It will be observed that the coating 4 extends over the entire length of the roller between the journals 3, that is, the coating 4 substantially entirely covers the central portion 1 and the transition portions 2 of the core 5. The coating 4 compensates for the differences in diameter between the central portion 1 and the transition portions 2 and defines a cylindrical outer surface about the portions 1 and 2.

The coating 4 may be composed of a synthetic resin. Preferably, the coating 4 is composed of a thermoplastic synthetic resin such as hard polyvinyl chloride or a finely crystalline polyamide, polypropylene or polyethylene. The coating 4 may also be composed of a mixture of two or more of these substances. If the coating 4 is composed of a synthetic resin, it may be extruded or injection molded on to the core 5 or applied thereto in any other suitable manner.

The coating 4 may also be composed of rubber including hard rubber. In such an event, the coating 4 may be vulcanized on to the core 5.

In order to manufacture the roller of the invention, a cylindrical or circular tube having the same wall thickness and diameter as the central portion 1 of the core 5 is selected. The tube is cut to a predetermined length which is a few percent smaller than the desired final length of the roller. The precise percentage depends upon the length of the tube, the lengths of the transition portions 2, the material of which the tube is composed and the ratio of the diameter of the tube to the diameter of the journals 3. The ends of the cut tube are then fed into a swaging machine. Each end is inserted into the swaging machine to such an extent that the respective part of the tube up to the plane identified by the reference numeral 1a, that is, the part of the tube corresponding to the respective journal 3 and transition portion 2, is subjected to a swaging action. The locations of the planes 1a are generally determined empirically and depend upon the desired lengths of the journals 3 and the transition portions 2. The part of the tube between the planes 1a or, in other words, the part of the tube corresponding to the central portion 1 of the core 5, is not deformed during the swaging operation. The ends of the tube are swaged until the desired final diameter of the journals is obtained. The swaging operation transforms the cut tube into the core 5 having the undeformed central portion 1, the transition portions 2 and the journals 3.

Modern swaging machines are generally capable of operating fully automatically and of taking into account in a single operation all required parameters such as deviation from concentricity, surface quality and parallelism of the ends of the tube as well as flexure.

Once the core 5 has been formed, the coating 4 is applied to the central portion 1 and the transition portions 2 thereof. As explained above, the coating 4 may be applied to the core 5 in any suitable manner. For instance, if the coating 4 is composed of a synthetic resin, the coating 4 may be extruded or injection molded on to the core 5. On the other hand, if the coating 4 is composed of rubber, the coating 4 may be vulcanized on to the core 5.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A roller for supporting material sensitive to radiation, particularly for transporting and/or squeezing sheet-like photographic material, consisting essentially of:
   (a) an elongated supporting member having a central portion of predetermined cross-sectional area and ends of smaller cross-sectional area constituting journals for said roller, said member being devoid of mechanical connectors and frictional connections for holding the same together; and
   (b) a protective coating on said member.

2. A roller as defined in claim 1, said member having a transition portion of varying cross-sectional area between said central portion and each of said ends; and wherein said coating is applied substantially exclusively to said central and transition portions.

3. A roller as defined in claim 1, wherein said coating constitutes a single layer.

4. A roller as defined in claim 1, wherein said member is tubular.

5. A roller as defined in claim 1, wherein said member is metallic.

6. A roller as defined in claim 1, wherein said member has a transition portion of continuously varying cross-sectional area between said central portion and each of said ends.

7. A roller as defined in claim 6, wherein said coating substantially entirely covers said central and transition portions.

8. A roller as defined in claim 6, wherein said central portion and said ends are substantially cylindrical.

9. A roller as defined in claim 8, wherein said transition portions are substantially conical.

10. A roller as defined in claim 1, wherein said coating is annular and concentric with said ends.

11. A roller as defined in claim 1, wherein said coating is resistant to aggressive fluids.

12. A roller as defined in claim 1, wherein the length of said roller is large as compared to its diameter.

13. A roller as defined in claim 1, wherein said coating comprises rubber or a synthetic resin.

14. A roller as defined in claim 1, wherein said coating comprises a thermoplastic synthetic resin.

15. A roller as defined in claim 14, wherein said resin is a polyvinyl chloride, a polyamide, a polypropylene, a polyethylene or a mixture of at least two such substances.

16. A roller as defined in claim 15, wherein said polyvinyl chloride is a hard polyvinyl chloride and said polyamide, polypropylene and polyethylene comprise fine crystals.

17. A roller as defined in claim 1, wherein said ends are swaged.

18. A method of making a roller for supporting material sensitive to radiation, particularly for transporting and/or squeezing sheet-like photographic material, comprising the steps of:
  (a) providing an elongated blank having opposite end portions;
  (b) subjecting the end portions to deforming forces which reduce the cross-sectional areas of said end portions to thereby form an elongated supporting member having a central portion of predetermined cross-sectional area flanked by two opposite ends of smaller cross-sectional area, said blank and said member being devoid of mechanical connectors and frictional connections for holding the same together; and
  (c) applying a protective coating to said member to thereby form a roller consisting essentially of said elongated supporting member and said protective coating, said member constituting a core and said opposite ends constituting journals for said roller.

19. A method as defined in claim 18, said member having a transition portion of varying cross-sectional area between said central portion and each of said ends; and wherein said coating is applied substantially exclusively to said central and transition portions.

20. A method as defined in claim 18, wherein said coating constitutes a single layer.

21. A method as defined in claim 18, wherein the subjecting step comprises swaging said end portions.

22. A method as defined in claim 18, said member having a predetermined length; and wherein the length of said blank prior to the subjecting step is less than said predetermined length.

23. A method as defined in claim 18, wherein said member is tubular.

24. A method as defined in claim 18, wherein said member is metallic.

25. A method as defined in claim 18, said central portion being undeformed; and wherein a transition portion of continuously varying cross-sectional area is formed between said central portion and each of said ends during the subjecting step.

26. A method as defined in claim 25, wherein said coating substantially entirely covers said central and transition portions.

27. A method as defined in claim 25, wherein said central portion and ends are substantially cylindrical.

28. A method as defined in claim 27, wherein said transition portions are substantially conical.

29. A method as defined in claim 18, wherein said coating is annular and concentric with said ends.

30. A method as defined in claim 18, wherein said coating is resistant to aggressive fluids.

31. A method as defined in claim 18, wherein the length of said roller is large as compared to its diameter.

32. A method as defined in claim 18, wherein said coating comprises rubber.

33. A method as defined in claim 32, wherein the applying step comprises vulcanizing said rubber on said member.

34. A method as defined in claim 18, wherein said coating comprises a synthetic resin.

35. A method as defined in claim 34, wherein said synthetic resin is thermoplastic.

36. A method as defined in claim 34, wherein the applying step comprises injection molding said coating onto said member.

37. A method as defined in claim 34, wherein the applying step comprises extruding said coating onto said member.

* * * * *